US 6,451,958 B1
Sep. 17, 2002

(12) United States Patent
Fan et al.

(54) RADIATION CURABLE ACRYLATE-TERMINATED POLYMERS HAVING POLYCARBONATE REPEATING UNITS

(75) Inventors: Mingxin Fan; Gary Ceska; James Horgan, all of West Chester, PA (US)

(73) Assignee: Sartomer Technology Company Inc., Wilmington, DE (US)

( * ) Notice: Subject to any disclaimer, the term of this patent is extended or adjusted under 35 U.S.C. 154(b) by 0 days.

(21) Appl. No.: 09/932,559

(22) Filed: Apr. 6, 2001

(51) Int. Cl.$^7$ ................................................. C08G 64/00

(52) U.S. Cl. ..................... 528/196; 528/198; 428/411.1; 428/412; 428/423; 525/435; 525/461; 525/269; 525/273; 525/290

(58) Field of Search ................................. 528/196, 198; 428/411.1, 412, 423; 525/435, 461; 430/273, 269, 290

(56) References Cited

U.S. PATENT DOCUMENTS 5,412,049 A * 5/1995 Argyopoulos et al. ...... 526/301
5,525,651 A * 6/1996 Ogoe et al. .................. 523/436

* cited by examiner

*Primary Examiner*—Terressa M. Boykin
(74) *Attorney, Agent, or Firm*—Michael B. Fein; Cozen O'Connor

(57) ABSTRACT

Polymer having repeating polycarbonate moieties of the formula (I)

$$(Acr)_y(A)(Q)(PC)[(Q)(PC)]_x(Q)(A)(Acr)_y \qquad (I)$$

wherein
  $(Acr)_y(A)$ is the residue of hydroxyalkyl acrylate or hydroxyalkyl methacrylate having an alkyl moiety, A, and where said alkyl, A, has 2 to 5 carbon atoms and wherein Acr is an acrylate or methacrylate moiety;
  Q is the residue of one or more organic polyisocyantes which are connected with A via a urethane linkage;
  PC is the residue of an alkylene diol polycarbonate of the formula (II)

$$HO(ROCOO)_nROH \qquad (II)$$

R is one or more ($C_2$ to $C_{10}$) alkylene or one or more ($C_6$ to $C_{12}$) aromatic group;
  y is an integer from 1 to 5;
  x is from 1 to 20;
  PC and Q are connected via a urethane group.

The acrylate terminate polymers are useful for radiation cured coatings which have superior adhesion and reverse impact strength, especially when applied to plastic substrates.

17 Claims, No Drawings

RADIATION CURABLE ACRYLATE-TERMINATED POLYMERS HAVING POLYCARBONATE REPEATING UNITS

BACKGROUND OF THE INVENTION

This present invention relates to the field of radiation curable polymers, particularly to acrylate terminated, radiation curable polymers useful for coatings. There have been many proposals for radiation curable coating polymers. Among the most commercially successful of such proposals are the epoxy acrylates, the polyester acrylates, and the urethane acrylates. Such acrylates have the advantages of having very low volatile organic compounds (VOC) as well as high productivity. Ultraviolet (UV) and electron beam (EB) are the most typical forms of radiation which are used to generate free radicals which initiate the polymerization or cure. While almost instant cure results in the high productivity, it also makes it difficult to achieve good adhesion, especially to difficult substrates such as polycarbonate (PC) and polyvinyl chloride (PVC). This problem is due in part to the lack of time for the cured matrix to relax.

Polycarbonate-containing acrylate-containing polymers having a single polycarbonate moiety have been suggested by Yamamoto, et al., U.S. Pat. No 5,178,952; Coqueugniot, et al., U.S. Pat. No. 4,255,243; Watson, Jr., U.S. Pat. No. 4,264,752 and Endo, et al., U.S. Pat. No. 5,143,997. However, such prior art polymers were not reported as having good adhesion or weathering properties.

SUMMARY OF THE INVENTION

It is an object of the present invention to provide radiation curable acrylic coating polymers which have adhesion properties on plastic substrates which are superior to the state of the art.

It is another object of the invention to provide polymers which can be UV or EB cured on plastic substrates and provide coatings which have excellent impact strength as well as adhesion properties.

These objects, and others which will become apparent from the following disclosure, are achieved by the present invention which comprises in one aspect a polymer of the formula (I)

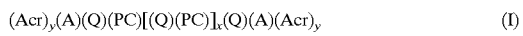

(Acr)$_y$(A)(Q)(PC)[(Q)(PC)]$_x$(Q)(A)(Acr)$_y$     (I)

wherein (Acr)$_y$(A) is the residue of hydroxyalkyl acrylate or hydroxyalkyl methacrylate having an alkyl moiety, A, and where said alkyl, A, has 2 to 5 carbon atoms and wherein Acr is an acrylate or methacrylate moiety;

y is the number of acrylate or methacrylate groups linked to moiety A.

Q is the residue of one or more organic diisocyantes, which are connected with A via a urethane linkage;

PC is the residue of an alkylene diol polycarbonate of the formula (II)

HO(ROCOO)$_n$ROH     (II)

R is one or more (C$_2$ to C$_{10}$) alkylene or one or more (C$_6$ to C$_{12}$) aromatic group;

y is an integer from 1 to 5;

x is from 1 to 20;

n is an integer from 1 to 10,000;

PC and Q are connected via a urethane group.

In another aspect, the invention comprises a process of preparing the polymers of formula (I) comprising reacting an alkylene or arylene diol polycarbonate with a molar excess of polyisocyanate to form urethane linkages, and then reacting the resultant isocyanato-functional polymer with a hydroxyalkyl acrylate or hydroxyalkyl methacrylate.

A still further aspect of the invention is a coating prepared by curing polymer of formula (I) by applying it to a substrate and curing in the presence of UV or EB radiation, the process of preparing the coating, and coated articles.

The polymers can be used alone or in combination with other free radically polymerizable materials such as allyl monomers and oligomers or (meth)acrylate monomers and oligomers. The coatings of the invention show excellent physical properties such adhesion, reverse impact strength, and weathering.

DETAILED DESCRIPTION OF THE INVENTION

The polyisocyanates used in this invention can be aliphatic or aromatic with various number of isocyanate groups, preferably two or more isocyanate groups per molecule. Some examples of isocyanates are isophorone diisocyanate, toluene diisocyanate, 4,4'-dicyclohexylmethane diisocyanate, hexamethylene diisocyanate, 4,4'-methylenebis(phenyl isocyanate). The polyisocyanates can be dimers, trimers, and polymers in nature such as allophanates, isocyanurates, uretdiones, biurets, of hexamethylene diisocyanate and isophorone diisocyanate. Preferred polyisocyanates are diisocyanates mentioned above such as isophorone diisocyantes, hexamethylene diisocyanate, and toluene diisocyanate, 4,4'-dicyclohexylmethane diisocyanate.

The condensation reaction can be carried out with or without catalysts. Catalyzed reactions are preferred due to the short reaction time and less side products. Typical catalysts can be used are amines, tin-based catalysts. Some catalyst examples are dibutyltin dilaurate, 1,4-diazabicyclo[2.2.2]-octane (DABCO), 1,8-diazabicyclo-[5.4.0]-undec-7-ene (DBU), N,N-dimethylcyclohexylamine (DMCA), tetramethyltin, tetrabutyltin, tetraoctyltin, tributyltin chloride, dibutyltin dichloride, dibutyltin oxide, dibutyltin diacetate, butyltin trichloride, dioctyltin dichloride, dioctyltin oxide, dioctylton dilaurate, dioctyltin diacetate. Other metal based catalysts are zinc, iron, bismuth, and zirconium complexes.

Hydroxyl containing (meth)acrylic esters can be monoesters or multifunctional esters. Some examples are hydroxyalkyl (meth)acrylates, pentaerythitol triacrylate, trimethyololpropane diacrylate, hydroxyethyl acrylate, hydroxypropyl acrylate, hydroxypropyl methacrylate, hydroxyethyl methacrylate, caprolactone modified hydroxy functional (meth)acrylate.

Polycarboante polyols can be aromatic or aliphatic and they can be prepared readily from diols as desribed well known in the art. Some examples are pentanediol based polycarbonatediol, cyclohexanedimethanol polycarbonatediol, hexanediol polycarbonatediol, ethylene glycol polycarbonatediol, propylene glycol polycarbonate diol, butanediol polycarbonatediol, and polycarbonate diol based on ethoxylated bisphenol A.

EXAMPLES

The following non-limiting examples illustrate a few embodiments of the invention.

Example 1

Preparation of Aliphatic Polycarbonate Urethane Acrylate 50.0 grams of isophorone diisocyanate, 0.1 gram of 4-methoxyphenol, 0.2 gram of dibutyltin dilaurate, and 115.0 polycarbonate diol (polyhexanediol carbonate, MW 1100) were charged into a 1000 ml reactor under stirring. The mixture was kept at 40–50° C. for 6 hours. Then 26.0 grams of 2-hydroxyethyl acrylate was added and reacted for two hours at 50° C. The final resin was obtained as clear viscous material with viscosity of 41000 cps at 60° C.

Example 2

Preparation of Polycarbonate Urethane Acrylate in the Presence of Reactive Monomer 33.0 grams of isophorone diisocyanate, 0.1 gram of 4-methoxyphenol, 0.2 gram dibutyltin dilaurate, 26.0 grams of isobomyl acrylate, and 100.0 grams of polycarbonate diol (polyhexanediol carbonate, MW 1100) were reacted following the above process. The final product is viscous, clear liquid with viscosity of 29000 cps at 60 C.

Example 3

Polycarbonate Based Acrylate Oligomers in UV Radiation Curing

Resins prepared above were tested in UV radiation cure, the neat resins were blended with 3% liquid photoinitiator (Irgacure 1700, Ciba Specialties). The final blends were applied to various substrates using a #10 application wire rod. The coated substrates were then cured on a UV curing unit equipped with a 300 w/in Hg lamp at a speed of 50 fpm. The cured coatings were tested for adhesion and reverse impact strength, with the results reported in the table below.

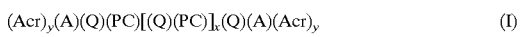

|  | Formulations | | | |
|---|---|---|---|---|
|  | Wt. % | | | |
| Component | 1 | 2 | 3 | 4 |
| CN120 (comparative) | 100 | | | |
| CN293 (comparative) | | 100 | | |
| CN978 (comparative) | | | 100 | |
| Example 2 | | | | 100 |

1) CN120, an epoxy acrylate resin based on bisphenol A diglycidyl ether marketed by Sartomer Company.
2) CN293, an aliphatic hexafunctional polyester acrylate resin prepared from acrylic acid, dimer fatty acid marketed by Sartomer Company.
3) CN978, a urethane acrylate oligomer prepared from polyether polyol, hydroxyethyl acrylate and toluene diisocyante marketed by Sartomer Company.

| Physical Properties of the Cured Films: | | | | |
|---|---|---|---|---|
| Film # | PC | PVC | Polystyrene | Reverse Impact (ibs*in) |
| 1 | 0 | 0 | 100 | 5 |
| 2 | 5 | 0 | 100 | 0 |
| 3 | 0 | 12 | 95 | 40 |
| 4 | 100 | 100 | 100 | >80 |

The adhesion numbers are % remaining in the crosshatch test.
The reverse impact test numbers are the products of weight and the heights.

As shown in the above table, the polycarbonate based resins are much better in impact strength and adhesion to plastic substartes, especially to polycarbonate type of substartes. The combination of excellent adhesion and high impact strength makes the new polycarbonate resins good for UV/EB curable formulations, especially for plastic substartes.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:
1. Polymer having repeating polycarbonate moieties of the formula (I)

$$(Acr)_y(A)(Q)(PC)[(Q)(PC)]_x(Q)(A)(Acr)_y \quad (I)$$

wherein $(Acr)_y(A)$ is the residue of hydroxyalkyl acrylate or hydroxyalkyl methacrylate having an alkyl moiety, A, and where said alkyl, A, has 2 to 5 carbon atoms and wherein Acr is an acrylate or methacrylate moiety;

y is the number of acrylate or methacrylate groups linked to moiety A;

Q is the residue of one or more organic diisocyanates, which are connected with A via a urethane linkage;

PC is the residue of an alkylene diol polycarbonate of the formula (II)

$$HO(ROCOO)nROH \quad (II)$$

R is one or more ($C_2$ to $C_{10}$) alkylene or one or more ($C_6$ to $C_{12}$) aromatic group;

y is an integer from 1 to 5;

x is from 1 to 20;

n is an integer from 1 to 10,000;

PC and Q are connected via a urethane group.

2. Polymer of claim 1 having a weight average molecular weight, $M_w$, of 300 to 1,000,000.

3. Polymer of claim 1 wherein said Acr is derived from a monomer selected from the group consisting of hydroxyethyl acrylate, hydroxyethyl methacrylate, caprolactone-modified hydroxyethyl acrylate, and caprolactone-modified hydroxyethyl methacrylate.

4. Polymer of claim 1 wherein R is alkylene selected from the group consisting of hexamethylene, pentane, cyclohexane, ethane, propane, butane, and cyclohexanedimethyl.

5. Polymer of claim 1 wherein Q is derived from an organic polyisocyanate selected from the group consisting of isophorone diisocyanate, toluene diisocyanate, 4,4'-dicyclohexylmethane diisocyanate, hexamethylene diisocyanate, and 4,4'-methylenebis(phenyl isocyanate).

6. Polymer of claim 1 wherein R is aromatic selected from the group consisting of polycarbonate diols based on ethoxylated bisphenol A.

7. Polymer of claim 1 wherein x is from 1 to 20.

8. Polymer of claim 1 wherein y is 1.

9. Polymer of claim 1 wherein said hydroxyalkyl acrylate or hydoxyalkyl methacryate is selected from the group consisting of hydroxyethyl acrylate, hydroxyethyl methacrylate, pentaerythitol triacrylate, pentaerythitol trimethacrylate, trimethyololpropane diacrylate, trimethyololpropane dimethacrylate, hydroxypropyl acrylate, hydroxypropyl methacrylate, caprolactone modified hydroxy functional acrylate, and caprolactone modified hydroxy functional methacrylate.

10. Process of preparing a polymer of formula (I) comprising reacting an alkylene diol polycarbonate with a molar excess of polyisocyanate to form urethane linkages, and then reacting the resultant isocyanato-functional polymer with a hydroxyalkyl acrylate or hydroxyalkyl methacrylate.

11. Process of claim 10 wherein said polycarbonate and said polyisocyanate are reacted in the presence of a catalyst selected from the group consisting of dibutyltin dilaurate, 1,4-diazabicyclo[2.2.2]-octane, 1,8-diazabicyclo-[5.4.0]-undec-7-enc, N, N-dimethylcyclohexylamine, tetramethyltin, tetrabutyltin tetraoctyltin, tributyltin chloride, dibutyltin dichloride, dibutyltin oxide, dibutyltin diacetate, butyltin tichloride, dioctyltin dichloride, dioctyltin oxide, dioctylton dilaurate, and dioctyltin diacetate.

12. Curable compositions prepared by curing polymer of formula (I) by applying it to a substrate and curing in the presence of UV or EB radiation.

13. Process of coating plastic substrates comprising applying a polymer of claim 1 to a substrate and curing in the presence of UV or EB radiation.

14. Process of claim 13 further comprising blending said polymer with a photoinitiator prior to applying to said substrate.

15. Process of claim 13 wherein said substrate is a plastic selected from the group consisting of polyvinyl chloride, polycarbonate, polystyrene, and polyester.

16. Article comprising a substrate coated according to the process of claim 9.

17. Article of claim 13 wherein said substrate is selected from the group consisting of polyvinyl chloride, polycarbonate, polystyrene, and polyester.

* * * * *